March 31, 1942.  A. VAN VEEN  2,278,005
MACHINE FOR WRAPPING ARTICLES
Filed April 4, 1939  10 Sheets-Sheet 6
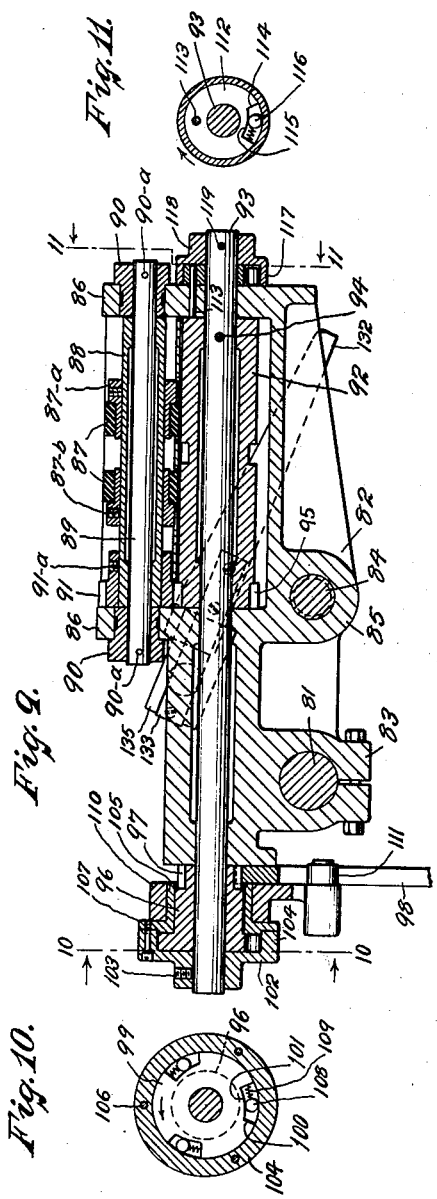
Inventor
ANTON VAN VEEN.
By
Louis V. Lucia
Attorney

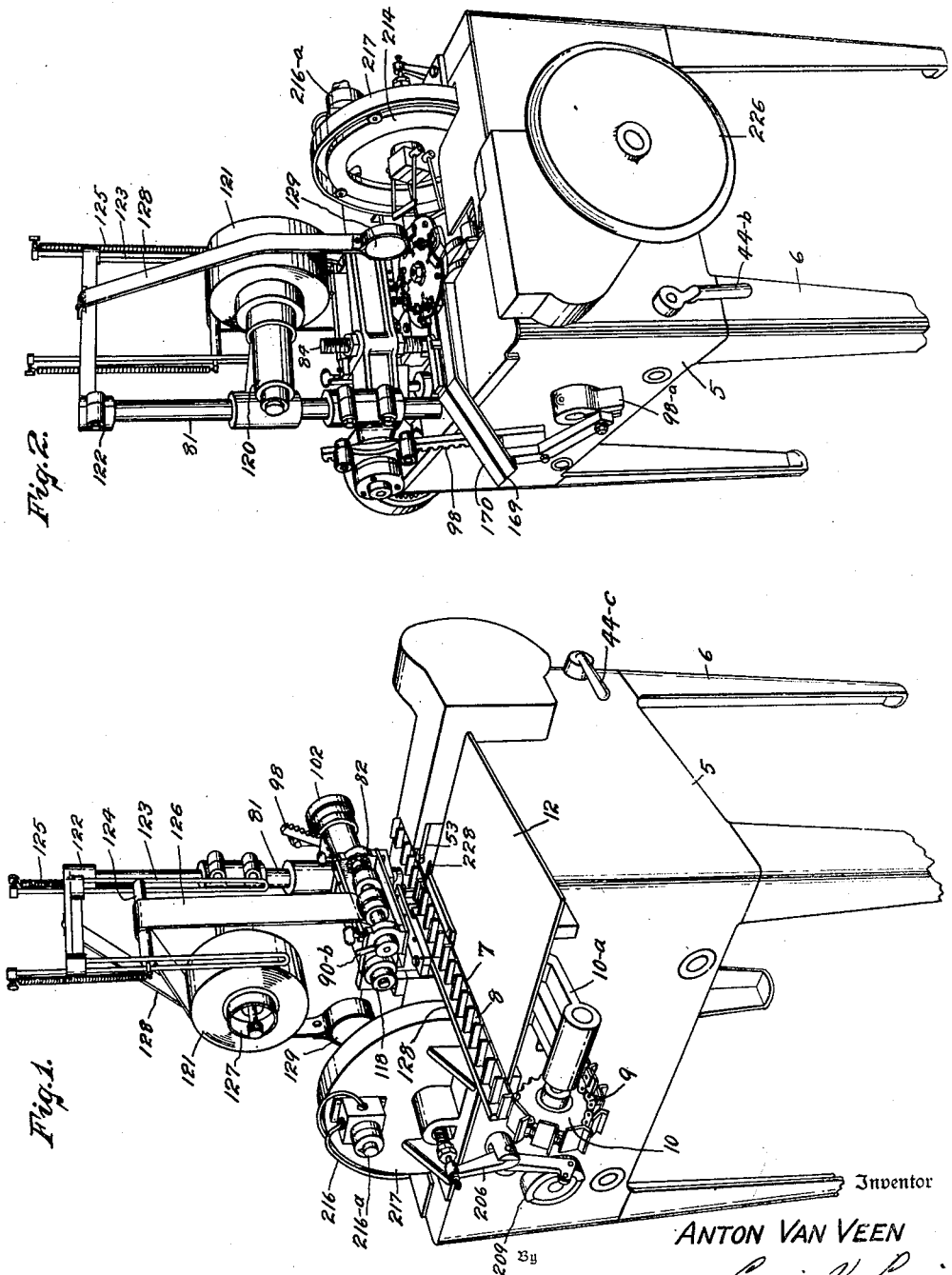

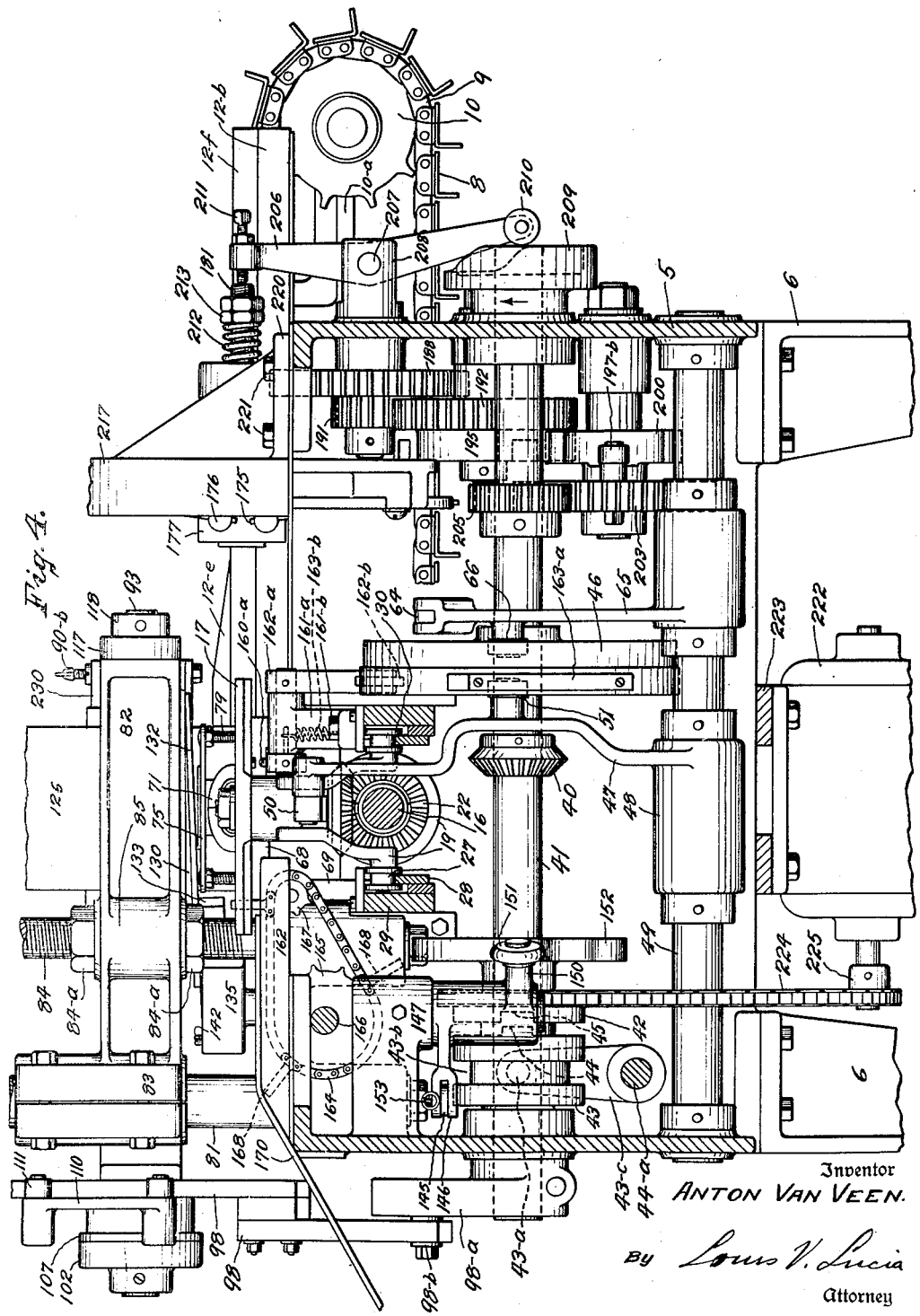

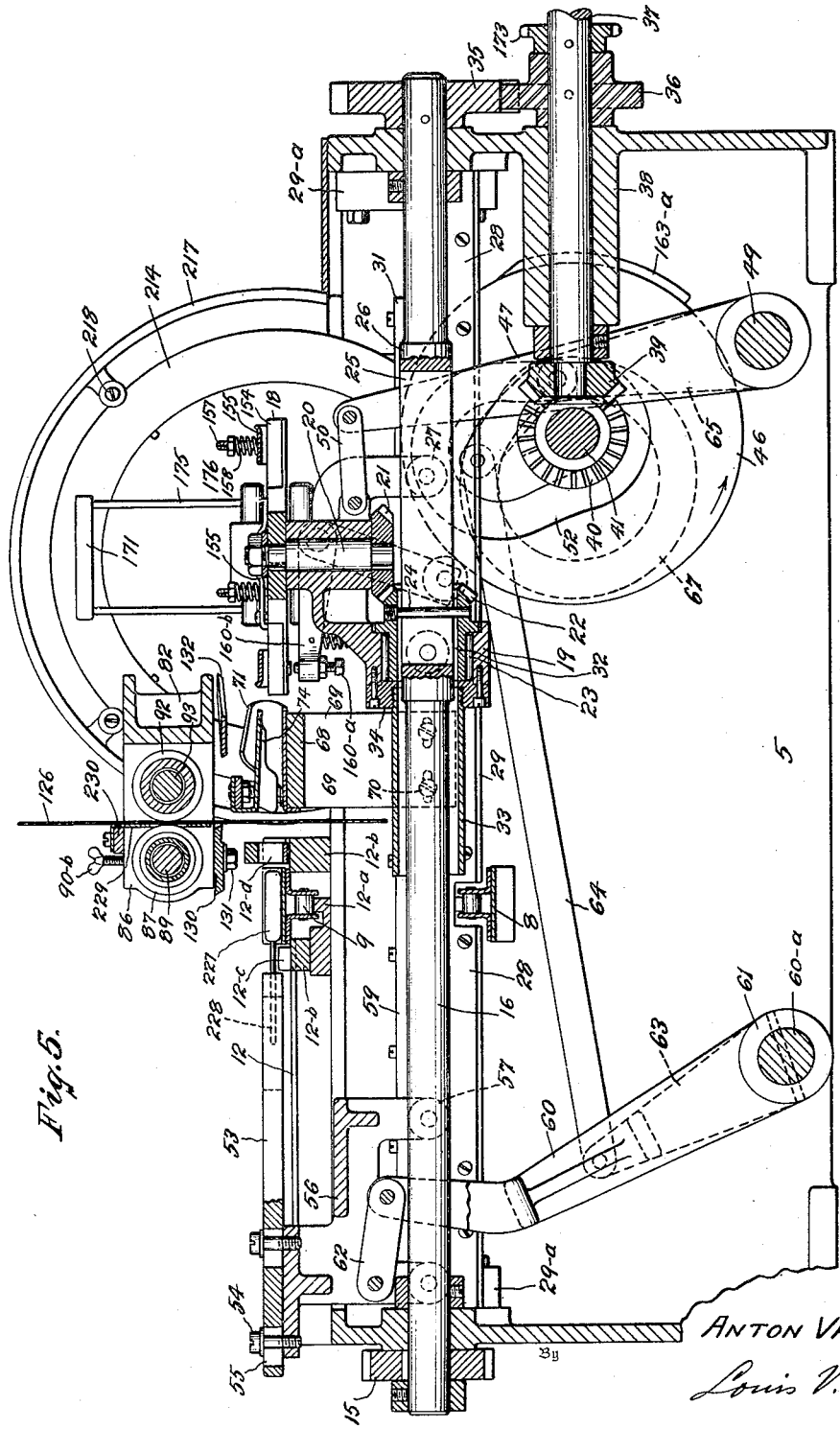

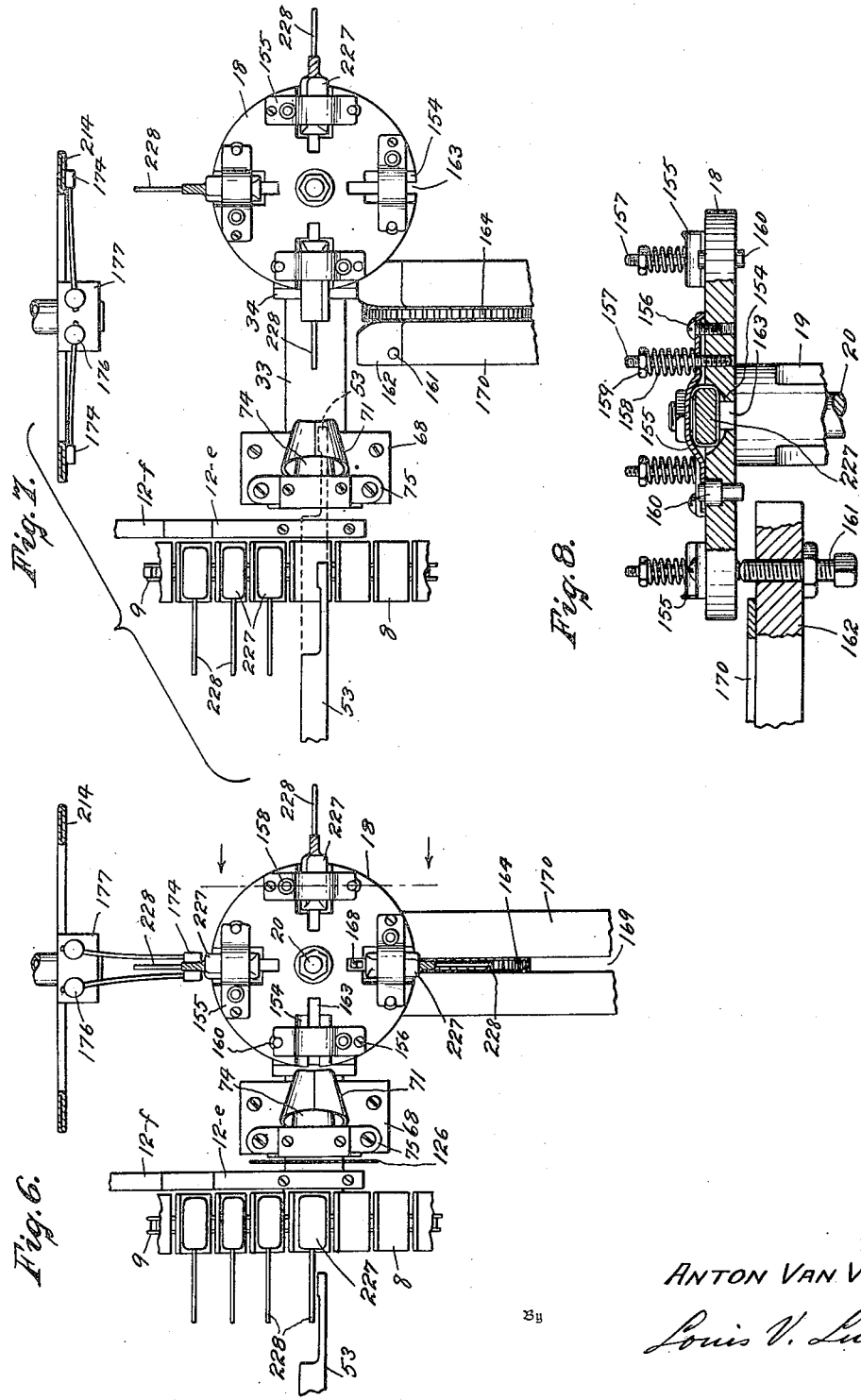

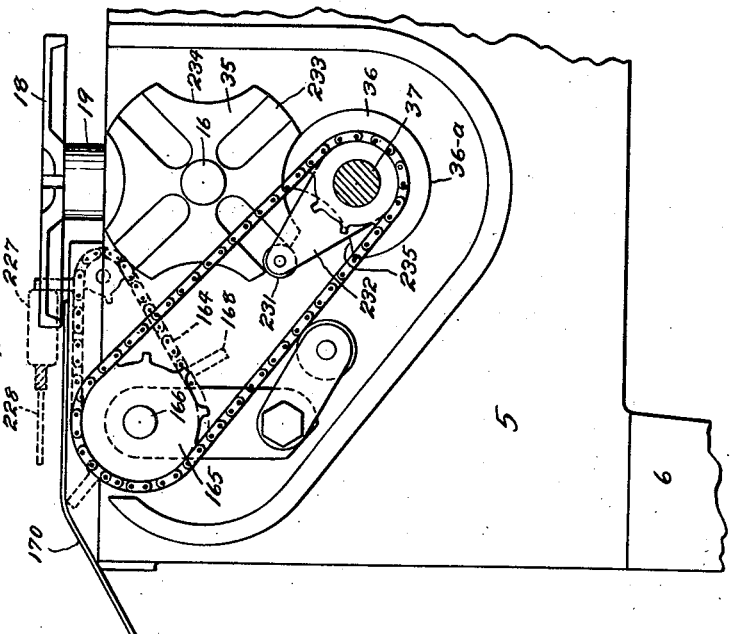

Inventor
ANTON VAN VEEN.
By Louis V. Lucia
Attorney

March 31, 1942. A. VAN VEEN 2,278,005
MACHINE FOR WRAPPING ARTICLES
Filed April 4, 1939 10 Sheets-Sheet 9

Inventor
ANTON VAN VEEN
By Louis V. Lucia
Attorney

March 31, 1942. A. VAN VEEN 2,278,005
MACHINE FOR WRAPPING ARTICLES
Filed April 4, 1939 10 Sheets-Sheet 10
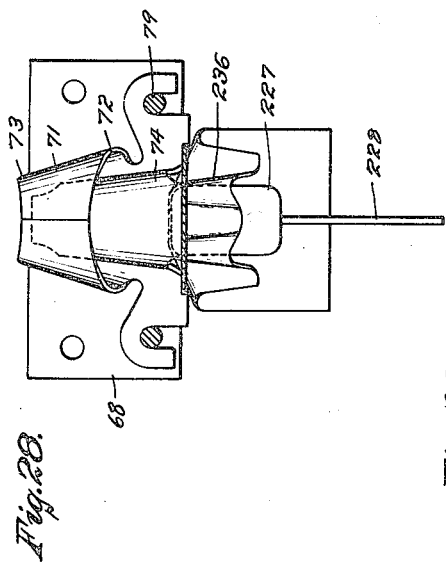
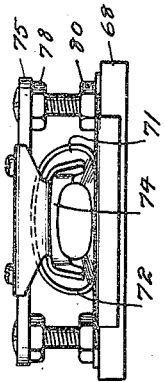
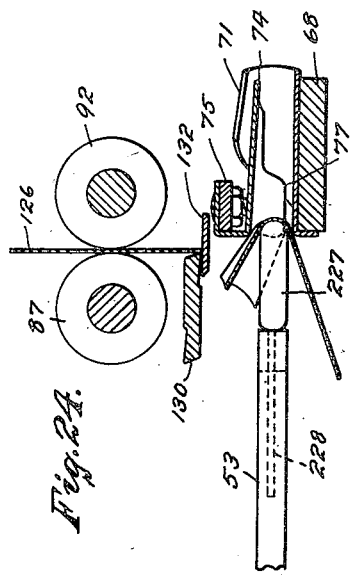
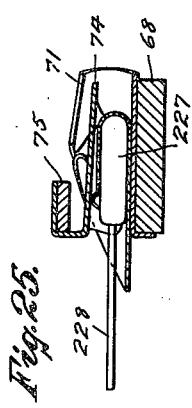
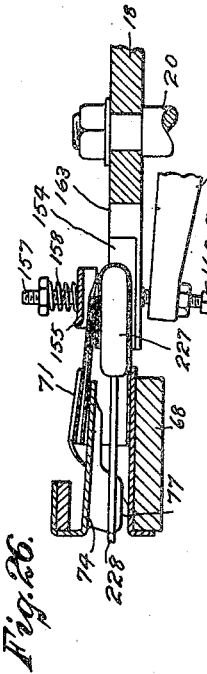
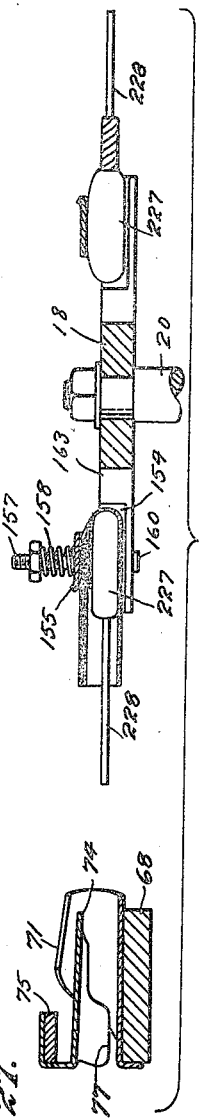
Inventor
ANTON VAN VEEN.
By Louis V. Lucia
Attorney Patented Mar. 31, 1942

2,278,005

UNITED STATES PATENT OFFICE 2,278,005

MACHINE FOR WRAPPING ARTICLES

Anton Van Veen, West Hartford, Conn.

Application April 4, 1939, Serial No. 265,878

14 Claims. (Cl. 93—2)

This invention relates to a novel machine and method for wrapping articles and, particularly, articles of confectionery such as lollipops.

An object of my invention is to provide an automatic machine which can be adjusted for wrapping articles of various shapes and sizes without requiring any further operation on the part of the operator than to place the articles on the machine.

A further object is to provide in such a machine, a novel method of wrapping articles by means of the motion which is applied to said articles while passing through the machine.

A further object of my invention is to provide a machine for wrapping lollipops in Cellophane wrappers and twisting said wrappers under heat to retain them in proper position on the article.

Further objects will be clearly understood from the following description and from the drawings in which:

Figures 1 and 2 are perspective views illustrating my novel machine as viewed from opposite sides thereof.

Figure 4 is a front view of the same, in central vertical section, on a further enlarged scale and on line 4—4 of Figure 3.

Figure 5 is a view in central vertical section and on line 5—5 of Figure 3.

Figure 6 is a diagrammatic plan view of the relative operation of the different mechanisms in the machine.

Figure 7 is a similar view illustrating the said mechanism in different positions.

Figure 8 is an enlarged fragmentary view, illustrating the construction of the turret mechanism and the clamp releasing means associated therewith.

Figure 9 is a plan view in central horizontal section and through the web feeding rolls of my improved machine.

Figure 10 is an end view of the clutch member for said rolls on line 10—10 of Figure 9.

Figure 11 is an end view, on line 11—11 of Figure 9, of another clutch member used with said rolls.

Figure 12 is a fragmentary view, of a portion of the machine, illustrating the said feed rolls in combination with the conveyor and cutter mechanisms of my improved machine.

Figure 13 is a fragmentary side view, in vertical section, illustrating the ejector mechanism.

Figure 14 is a side view of the same in elevation.

Figures 24, 25, 26 and 27 are fragmentary views, in vertical section, illustrating different steps in the operation of the mechanism of my machine while wrapping a lollipop.

Figure 28 is a plan view, of the novel folding device, showing one step of the wrapping operation which is performed thereby.

Figure 29 is a front view of the said folding device.

Figure 3:
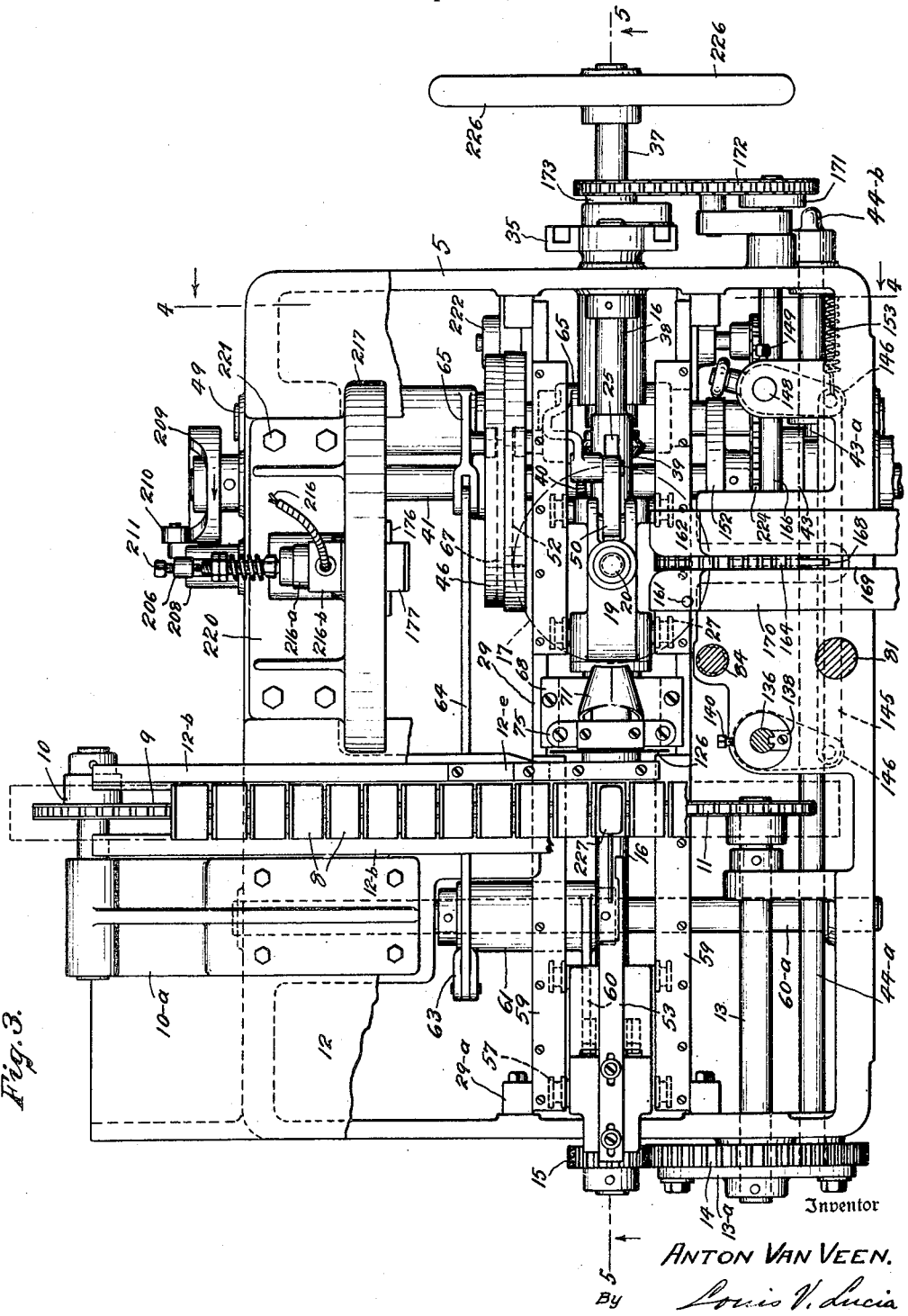
Figure 3 is a plan view, of said machine, on an enlarged scale and with parts broken away to show the construction thereof.

As illustrated in the drawings, my improved wrapping machine comprises a base which is built in the form of a casing, that is mounted on legs 6 and contains the various parts of the mechanism that will be hereinafter described in accordance with the sequence of operation of the various units incorporated in the machine.

As clearly illustrated, in Figure 1 of the drawings, my machine includes a conveyor belt 7 which is composed of a number of receptacle plates 8 secured to an endless chain 9 that extends over a sprocket 10, which is supported in a bracket 10—a, and a sprocket 11. The said conveyor belt moves across the table 12 on a track 12—a and is positioned horizontally by guides 12—b which, with the said tracks, are mounted upon the top of the base 5 of the machine. A positioning bar 12—c is mounted adjacent to said conveyor belt to position thereon the articles that are to be wrapped as will be hereinafter described. A guide 12—d is mounted upon said track at the opposite side of the conveyor belt for guiding the articles as they are removed from said belt. The said guide comprises a U-shaped member which depends from the supporting bar 12—e which is mounted upon a bar 12—f that forms a wall for locating the articles on the plates 8 of the said conveyor belt.

The said belt is driven by means of the sprocket 11 which rotates with the shaft 12 that is connected to a disc 13—a upon which is adjustably mounted a gear 14 that meshes with a pinion 15 on the operating shaft 16 which is intermittently rotated for each wrapping operation of my machine.

A turret 17 is provided for carrying the articles, which are being wrapped, to positions in the machine where the different operations are performed.

The said turret comprises a plate 18 which is rotatably mounted in a turret carriage 19, by means of a shaft 20 which extends vertically through the said carriage. A beveled gear 21 is secured to said shaft and meshes with a beveled gear 22 that is mounted in said carriage by means of a roller bearing 23. The said gear 22 has a connecting pin 24 which extends through a slot 25, in an enlarged portion 26 of the shaft 16, and provides a sliding connection for causing said shaft to rotate the gear and permit it to travel with the carriage 19. The carriage 19 is supported on grooved wheels 27 which roll on a track composed of bars 28 which are mounted on supporting beams 29, that extend to opposite sides of the base 5, are secured thereto by means of hangers 29—a, and are spaced from said beams to accommodate the flanges 30, on the wheels 27. Retaining plates 31 are secured on the beams 29 to retain the said wheels, and carriage, upon the track bars 28.

It will be noted, particularly from Figure 5 of the drawings, that the shaft 16 extends through an opening 32, in the beveled gear 22, and is spaced from the walls of said openings to permit free longitudinal movement of the carriage 19 over the said shaft. A shield, in the form of a tube 33, is threaded to a plate 34 which is secured to said carriage by means of screws. The said shield surrounds the shaft 16 and is provided for the purpose of preventing any fragments, of the material of the articles being wrapped in the machine, from dropping into the slot 25 and, thereby, interferring with the movement of the pin 21 in said slot.

The shaft 16 is operated by means of a Geneva movement which includes a Geneva wheel 35 that is mounted to the end of said shaft and driven by a driving wheel 36 on the shaft 37 which extends through the bearing 38, in the base 5. The said shaft 37 has a beveled gear 39 thereon which meshes with a beveled gear 40 on a driving shaft 41 that extends across the said base 5 and is rotatably mounted therein.

A sprocket 42 is rotatably mounted on said shaft 41 and is adapted to be engaged by a clutch collar 43 which is slidably keyed to said shaft and has a projection 44 that is adapted to be moved into engagement with a notch 45 in the hub of the said sprocket 42. The said collar 43 is operated by means of pins 43—a which project into the groove 43—b, in the said collar, from rocker levers 43—c which are mounted on a rocker shaft 44—a that extends through the base 5 of the machine and is actuated, to operate said clutch, by either of the handles 44—b or 44—c which are located at the sides of said base.

A cam wheel 46 is also mounted on and rotates with the shaft 41. A turret carriage operating lever 47 is pivotally mounted, by means of a hub 48, on a pivot shaft 49 which extends across the base 5. The swinging end of said operating lever 47 is connected to the turret carriage by means of a link 50 and a roller 51 projects from said lever into a cam groove 52 in one side of the cam wheel 46.

A pusher bar 53 is adjustably mounted, by means of screws 54 extending through elongated slots 55, to a pusher carriage 56 which is carried by wheels 57 that also roll on the track 28 and are retained upon said track by means of the retaining plates 59.

A rocker lever 60 is mounted on and connected to rotate with a rocker shaft 60—a by means of a hub 61. The swinging end of said lever is connected to the pusher carriage 56 by means of a link 62. A rocking lever 63 is also connected to the said rocker shaft 60—a and operated by a link 64 which is connected to a lever 65. The said lever is pivotally mounted on the pivot shaft 49 and has a roller 66 projecting into a cam groove 67 in the side of the cam wheel 46 opposite to the side thereof which contains the cam groove 52.

A wrapper folding device is mounted upon a plate 68 which is supported on upright members 69 that are adjustably secured, by means of screws 70, to the sides of the track supporting bars 29. The said device comprises a horn 71 which tapers from the mouth portion 72 towards the end 73. The edge of the mouth is shaped to fold the sides of the wrapper towards the center of the horn as will be hereinafter described.

A shoe 74 is mounted upon a supporting bar 75 and extends inwardly into the horn 71. The said shoe has wrapper folding edges 76 and 77 and the supporting bar 75 is adjustably positioned, by means of the bolts 78 on the threaded posts 79, so that the shoe 74 may be adjusted with relation to the interior of the horn 71 to properly fold the wrapper during the operation which will be later described. The said horn 71 is secured to the plate 68 by means of nuts 80 which are threaded to the lower part of the posts 79.

The mechanism for feeding the wrappers to the machine will now be described.

As clearly illustrated in Figures 9 to 12 of the drawings, the said mechanism is mounted upon a vertical post 81, which extends upwardly from the base 5 of the machine, and comprises a roller supporting frame 82. The said frame is adjustably secured to the post 81 by means of clamp connection 83 and positioned, upon the base 5 of the machine, by means of a threaded post 84 which extends through a boss 85. Nuts 84—a are threaded to said post 84 to engage the top and bottom surfaces of the frame for securely clamping the same in the position relative to the length of the wrapper blank desired. This will be better understood from further description which will be given herein.

The frame 82 has extensions 86 between which are mounted web feeding rolls. One of said rolls consists of a pair of flexible roll sections 87 that are adjustably mounted, on a sleeve 88, by means of collars 87—a which are provided with adjusting screws 87—b for adjustably securing the said flexible rolls to the sleeve 88. The said sleeve is rotatably mounted on the stationary shaft 89 which, in turn, is mounted in, and between, the extensions 86 by means of eccentric collars 90 which are secured in alignment, to the ends of said shafts by means of pins 90—a. The said collars are adjustably rotatable in said extensions 86 and secured against rotation therein by set screws 90—b. A gear 91 is also mounted upon the sleeve 88 and secured thereto, by means of a screw 91—a, for rotating the same.

The collars 90 are provided with handles 90—b, for rotating them when they are to be adjusted.

The other feed roll 92 is secured to a shaft 93, by means of a pin 94, and is provided with gear teeth 95 which mesh with the teeth of the gear 91 for rotating the rolls 87 with the said roll 92.

A one-way clutch is provided for intermittently rotating the said shaft 93 to feed a desired length of web for each operation thereof. The said clutch includes a collar 96 which is rotatably mounted to one end of the shaft 93 and against the end of the frame 82 through which the said shaft extends. The said collar is provided with teeth 97, which mesh with the teeth of a rack 98 that is actuated by means of a crank 98—a which rotates with the driving shaft 41. The said rack is adjustably connected to the crank 98—a, by an adjustable pivot 98—b, to vary the length of the stroke of said rack, in driving the feed rolls 87 and 92, so as to feed the desired length of the web 126 for the different sizes of articles which can be wrapped in the machine.

The collar 96 is provided with a flange 99 which has a plurality of notches 100, the bottoms of which are formed to provide cam surfaces 101. A clutch disc 102 is secured to the end of the shaft 92, by means of a screw 103. The said clutch disc has a wall 104 which extends over the flange 99, of the collar 96, and a bushing 105 is secured to the said wall by means of screws 106 extending through said wall and threaded into a flange 107 on said bushing; thus is formed a housing within which the collar 96 is rotatably mounted on the end of the shaft 93. The bushing 105 is rotatably mounted on the collar 96 and the flange 99 thereof is disposed with its peripheral edge adjacent to the inner surface of the annular wall 104. Clutch rollers 108 are contained within the notches 100 and forced, by means of springs 109, between the inner surface of the wall 104 and the cam surfaces 101. When the collar 96 is rotated by the rack 98, in the direction indicated by the arrow in Figure 10 of the drawings, the said rollers will bind the collar to the clutch disc 102 and thereby cause rotation of the shaft 93 which will operate the feed rolls 87 and 92.

A holder 110 is rotatably mounted on the bushing 105 and has rollers 111 which engage the rack 98 to hold the same with the teeth thereof into engagement with the teeth 97 on the collar 96.

A retaining clutch is provided, at the other end of the shaft 93, in order to hold the said shaft against rotation when the collar 96 is being rotated in a reverse direction by the rack 98. The said retaining clutch consists of a cam disc 112 which is mounted over a shaft 93 and secured, against rotation, by means of a pin 113 extending into the frame 82. The disc is provided with a notch 114, having a cam surface 115, in which is contained a clutch roller 116 that is forced against said cam surface and, thereby, into radial engagement with the inner wall of a flange 117 on a disc 118 that is secured to the end of the shaft 93 by means of a pin 119.

A bracket 120 is also adjustably mounted upon the post 81, to support a web roll 121. Another bracket 122 is secured to the top of said post 81 and has, mounted therein, parallel slide rods 123 between which is disposed an idler web roll 124 which is suspended from springs 125 for yieldingly supporting the web 126 which is carried from a roll 121, over the said roll 124, and downwardly between the feed rolls 87 and 92. A web roll clamping device 127, which is not described in detail herein, is mounted in the bracket 120 to retain the roll of the web 121 thereon, and a brake, in the form of a strap 128 is anchored to the bracket 122. The said strap depends downwardly from the bracket and is held into engagement with the periphery of the roll 121, by means of a weight 129 which is secured to the lower end of said strap, to prevent free rotation of the web roll when a sudden pull is exerted upon the end of the web 126 and there is a tendency to unwind the said roll. The roll 124 will act to cushion the pull on said roll 121 by sliding vertically between the parallel rods 123 against the pull from the springs 125.

My machine is provided with a web shearing device which includes a stationary cutting blade 130 that is mounted to the bottom of the frame 82 and is secured to the extensions 86, by means of bolts 131. The said blade has cutting edges on two sides thereof so that it may be reversed when it is desired to present a new cutting edge in operative position.

A movable cutting blade 132 is mounted on a rocker bar 133 which is pivoted, as at 134, within the slot in the head 135 at the top of the vertically adjustable post 136. The said post is mounted in a sleeve 137 and is held against rotation therein by means of a key 138 which is secured by a screw to a flange 139 on said sleeve. A set screw 140 also extends through said collar for locking said post in position within the sleeve 137.

The movable blade 132 is forced in an upward direction, and into cutting engagement with the blade 130, by means of the spring 141 which is located within the rocker bar 133 and between the said blade 132 and the bottom of the slot 135. A set screw 142 is provided in the said rocker bar for limiting the movement which is applied thereto by the said spring 141.

The sleeve 137 is rotatably mounted within a bearing 143, in the base 5 of the machine, and is vertically supported therein by the flange 139 which rests upon the top of the said base.

A lever 144 is secured to the lower end of the said sleeve 137 and a connecting link 145 extends from the end of said lever to the lever 146 which is mounted in the bearing 147 by means of a pivot stud 148 that is secured in said bearing by a set screw 149. The said lever 146 is provided with an extension 150 to the end of which is mounted a roller 151 which is held in engagement with a cam 152, on the driving shaft 41, by means of a spring 153.

It will be noted that the said post 136 may be adjusted, vertically, to place the blade 132 in operative position with relation to the stationary blade 130 and in whatever position the said stationary blade may occupy on account of the position of the frame 82 on the post 81.

The turret plate 18 is provided with a plurality of article receiving recesses 154 which are secured to said plates by means of screws 156 and extend across the top of said recesses. Each of said clamping plates has a threaded post 157 which is mounted in the plate 18 and extends through the plate. A spring 158 is adjustably secured on said post by means of a nut 159 for forcing said clamping plate downwardly on the plate 18 to clamp articles within the recesses 154.

A clamp releasing pin 160 is provided under the end of each of said clamping plates. The said pin is mounted in a recess in said plate and has a projection extending through the bottom of the plate. An adjustable releasing screw 161 projects upwardly from a plate 162 that extends towards the turret, from the top of the base 5, and positions said screw to engage and lift the pins 160 so as to raise the clamping plates 155 against the tension of the spring 158. The said pins 160 are also operated, to raise the clamping plates 155, by a set screw 160—a in the end of a lever 160—b that is pivoted by a rocker shaft mounted in a bracket 161—a which is supported on and secured to one of the retaining plates 31, by means of bolts 161—b. A lever 162—a is connected to the said rocker shaft, extends downwardly therefrom and has a roller 162—b in the end thereof which is adapted to be engaged by a cam 163—a that is secured to the periphery of the cam wheel 46. The said cam is adapted to rock the lever 160—b, through the said lever 162—a, against the tension of a spring 163—b and thereby cause the set screw 160—a to raise the clamping plates 155. The turret plate 18 is provided with slots 163 which extend radially therein and through the bottom of each of the recesses 154.

In order to eject articles from the said turret, I provide an ejector mechanism which comprises an endless chain 164 that is carried on a sprocket 165, which is mounted on a shaft 166, and an idler sprocket 167 which is rotatably mounted in the plate 162. The said chain 164 carries thereon a plurality of ejector fingers 168 which pass through the slots 163, in the turret plate 18, and through a slot 169 in the table 170, which is mounted on said plate and is inclined downwardly over the side of the base 5. The shaft 166 extends through the side of the base 5 and has connected thereto a driving sprocket 171 which is driven by means of a chain 172 that is driven by a sprocket 173 on the shaft 37.

My machine is also provided with a twister mechanism for twisting the wrapper on the article to securely retain said wrapper thereon. The said twister mechanism comprises a pair of twisting bars 174 that are mounted, by means of yieldable fingers 175, to rocker bars 176 whereby they are pivoted in the head 177 of a rotatable sleeve 178. The said bars 176 are rotatably mounted in the openings 179 which extend through said head and intersect, at opposite sides thereof, an opening 180 which extends longitudinally through the sleeve 178.

A slide bar 181 is slidably mounted in said opening 180, with the end thereof between the said rocker bars 176, and has teeth 182 on opposite sides thereof, which mesh with teeth 183 on the bars 176, for operating the said bars to rock the same and thereby operate the twister bars 174. The said slide bar 181 is connected to rotate with the sleeve 178 by means of a pin 184 which extends into a slot 185 from a screw 186 which also connects a pinion 187 to said sleeve for rotating the sleeve and thereby also rotating the twister bars 174. The pinion 187 is rotated by means of a gear 188 which rotates on a stud 189 that is mounted in a boss 190 in the base 5. The said gear 188 has a pinion 191 which meshes with a gear 192 that is rotatably mounted on a stud 193 in a boss 194 in the base 5. The said gear 192 is intermittently rotated by means of a Geneva wheel 195 which is co-axially secured thereto by means of screws 196.

A Geneva driving wheel 197 is rotatably mounted on a stud 198, which extends from a boss 199, and has a flange 200 with peripheral surfaces 201 that are adapted to inter-engage corresponding notches 202 in the periphery of the Geneva wheel 195 to retain the same in stationary position between the intermittent rotations thereof. The said driving wheel has two arms 197—a on which are mounted rollers 197—b that engage the forward wall of grooves 195—a and rotate the Geneva wheel 195.

A gear 203 is secured to the said driving wheel 197, by means of bolts 204, and is driven by means of a pinion 205 on the shaft 41.

The bar 181 is moved, longitudinally in the sleeve 178, by means of a rocker lever 206 which is pivoted at 207 in a bracket 208, extending from the stud 189, at the side of the base 5. The said rocker lever 206 is rocked on its pivot by means of a cam 209 which rotates with the shaft 41 and engages a roller 210 extending from the end of said rocker lever. A set screw 211 is threaded through said lever and engages the end of the slide bar 181 for moving the same against the action of a spring 212 which is positioned between the end of the sleeve 178 and the adjusting nuts 213 that are threaded to said bar.

My machine is particularly adapted for wrapping articles in wrappers of Cellophane or other similar material. In the use of said material, however, it is necessary to apply heat thereto so as to prevent the wrapper from unfolding. I, therefore, provide a heating element, in the form of a ring 214, having imbedded therein, and properly insulated therefrom, an electrical resistor 215 which is connected, by means of electrical conductors 216, to an electrical circuit that is controlled by a switch 216—a mounted on a bracket 216—b that is secured to the back of the shield 217. The said heating element is mounted in the shield 217 by means of screws 218 threaded to bosses 219 which support said heating element and space it from the shield so as to eliminate wastage of heat by conduction. The said heating element is mounted co-axially with the sleeve 178 so that the twister bars 174 may contact with the surface of said heating element in any circumferential position thereon and the shield 217 is provided with a base 220 by means of which it is secured to the top of the base 5 by bolts 221.

My machine is powered by means of a suitable electric motor 222 which may be supported on bars 223 secured to the bottom of the base 5 and connected to drive the shaft 41 through a chain 224 which extends from a sprocket 225, on said motor, to the sprocket 42 on said shaft. A hand wheel 226 is also provided upon the shaft 37 for rotating the shaft 41 when it is desired to operate the machine by hand.

In the embodiment illustrated, the said machine is shown as used for wrapping such articles as lollipops which comprise a piece of confectionery 227 having a stick 228 extending therefrom to provide a handle.

The various mechanisms of the machine are adjusted as follows, for the particular article that is to be wrapped therein.

The roll of web 121, preferably of Cellophane material, is first mounted on the clamping device 127 in the bracket 126. The end of the web is then passed over the roll 124, down between the rolls 87 and 92 and against a guide plate 229 which is mounted on a bar 230 and extends between the said rolls.

The said web is then pulled downwardly, to the position clearly shown in Figure 5, past the cutting edge of the blade 130. If necessary, the frame 82 may be adjusted, vertically on the post 84, to provide, below the cutting edge to the blade 130, whatever length of webbing may be required as a wrapper for the particular article to be wrapped.

The movable shearing blade 132 is then adjusted in proper position, with relation to the cutting edge of the blade 130, for cutting off the length of web which depends below the said cutting edge and between the guide 12—e and the wrapping device which comprises the horn 71.

When the machine is started in motion, by operating either of the handles 44—c or 44—b to throw the clutch collar 43 into engagement with the sprocket 42, the shaft 41 is set in continuous rotation and rotates, with it, the crank 98—a which will oscillate the bar 98 and thereby impart two-directional rotation to the collar 96. When the said collar is rotated in the direction indicated by the arrow in Figure 10, the clutch rollers 108 will engage the said collar with the clutch disc 102 and thereby rotate the shaft 93 which will, in turn, rotate the roll 92 and, through the gear teeth 95 and 91, rotate the roll 87 on the sleeve 88. This rotation of the rolls will intermittently feed the proper length of web between the guide 12—e and the folding device.

The continuous rotation of the shaft 41 will, through the gears 40 and 30, and the shaft 37, continuously rotate the Geneva driving wheel 36. During the rotation of said driving wheel, the roller 231, at the end of the extension 232, will engage the forward wall of a groove, 233 in the Geneva wheel 33, and rotate the said wheel for a distance of 90°. After the said wheel has been rotated for this distance, the circumferential periphery 36—a of the wheel 36 will enter into the corresponding notch 234 and retain the said wheel against rotation until the roller 231 has again moved around to the position where it will engage the next groove 233; at which time the edge of the notch 235 in the said driving wheel will have reached a position, relative to the edge of the wheel 33, wherein it will permit the said wheel to be rotated for another distance of 90° and so on. Thus, from the illustration in Figure 14, it will be clearly understood that for each rotation of the driving wheel 36, the Geneva wheel 33 will be rotated one quarter of a revolution and then locked in position against rotation until it is again so rotated.

The said Geneva wheel 33 will impart the one quarter rotations to the shaft 16 which, through the pinion 15, the gear 14, the shaft 13 and the sprocket 11, will move the conveyor belt 7 for the distance of one of the plates 8 thereon.

The shaft 16, by reason of the Geneva movement, will make one quarter of a revolution for each complete revolution of the shaft 41; which rotates the crank 98—a through a complete cycle. Therefore, it will be clearly seen that the rolls 87 and 92 are rotated, to feed the proper length of web 126 to provide enough for a wrapper below the cutting edge of the knife 130, for each forward movement of the said conveyor belt.

Each one quarter revolution of the shaft 16 will also, through the gears 20 and 21, rotate the turret plate 18 for one quarter of a revolution; thus consecutively presenting the recesses 154, in the turret plate 18, in the front of the folding horn 71 for each movement of the belt 7.

For each step of movement applied to the conveyor belt 7, the cam groove 67 will cause the lever 65 to move the carriage 56, through the lever 63, the rocker shaft 60—a, the lever 60 and the link 62, and thereby move the pusher bar 53 forward. The cam groove 52 will operate the lever 47 causing the same, through the link 50, to slide the turret carriage 19 and thereby move the turret away from the folding horn for each rotation of the shaft 41 and movement of the conveyor belt 7.

The twister mechanism will operate as follows for each movement of the conveyor belt 7.

It will be understood that, for each movement of the conveyor belt 7, the shaft 41 is rotated for one revolution which, through the pinion 205 on said shaft, will rotate the driving wheel 197 one-half of a revolution. The said driving wheel will, therefore, rotate the Geneva wheel 195 one quarter of a revolution, or 90° for each revolution of the shaft 41, the said Geneva wheel will rotate the gear 192, the pinion 191, the gear 188, the pinion 185 and thereby rotate the sleeve 178 for a number of revolutions for each one quarter revolution of the said Geneva wheel 195. It will, therefore, be seen that the head 177 will be rotated a number of revolutions during one half of each of the revolutions of the shaft 41 and that the said head will remain stationary during the other half of said revolutions.

Figure 15:
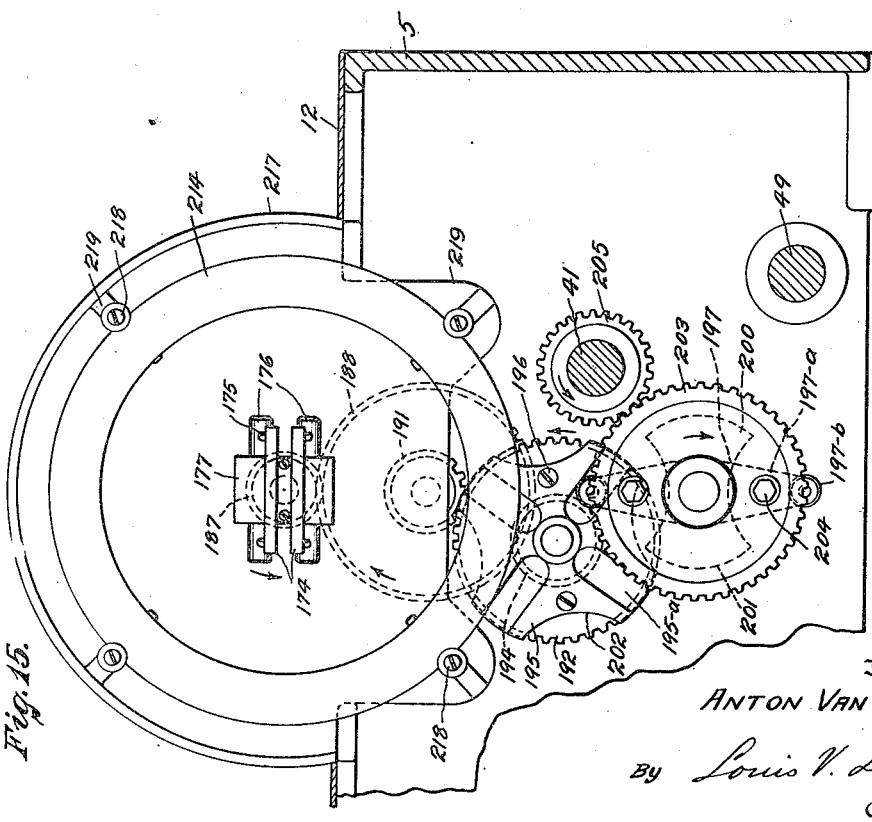
Figure 15 is a sectional view, through a portion of my machine, illustrating the twister mechanism of my improved machine.
Figure 17:
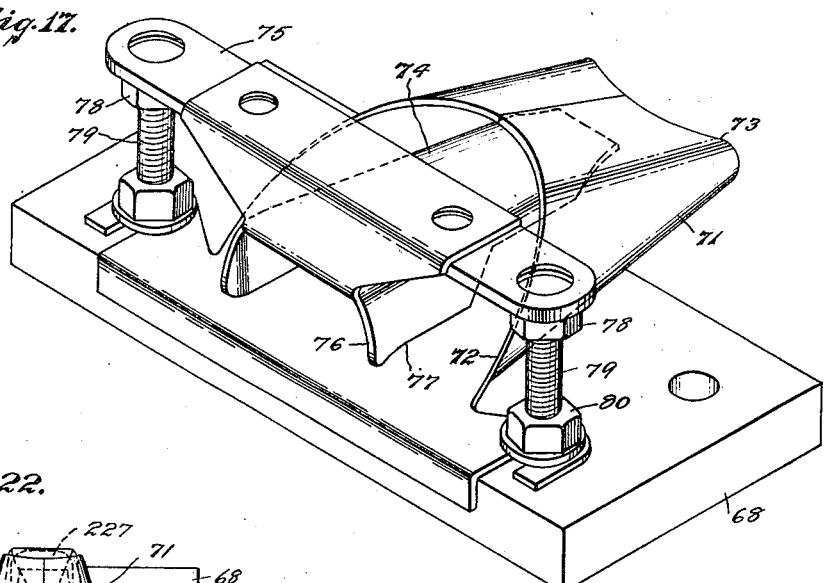
Figure 17 is a perspective view illustrating the novel wrapper folding device used in my machine.
Figure 22:
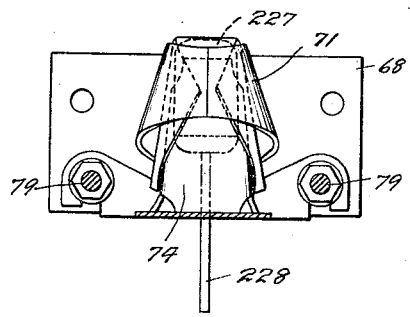
Figures 22 and 23 are views illustrating two steps in the operation of folding said wrappers as performed by the folding shoe of my improved machine.
Figure 18:
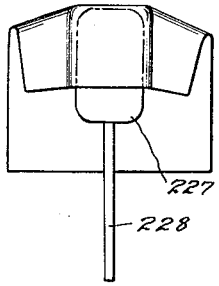
Figures 18, 19, 20 and 21 are views illustrating different positions of a wrapper as it is applied to a lollipop while passing through my improved machine.
Figure 19:
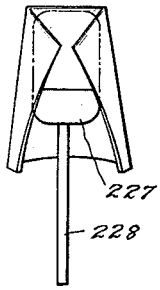
Figure 23:
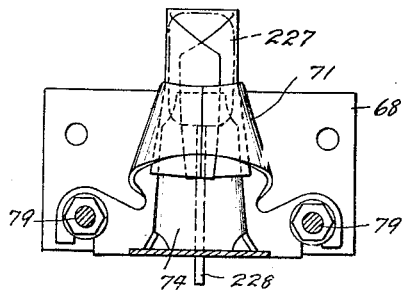

While the head 177 is stationary, the twister bars 174 will rest into heating contact with the heating element 214, as clearly illustrated in Figure 5 of the drawings. Just about the time that the head 177 begins its rotation, the said bars will be moved towards each other, to the position illustrated in Figures 15 and 16, by means of the cam 209 which will release the lever 206 and permit the spring 212 to move the slide bar 181 and cause the teeth 182 thereon to rock the rocker bars 176 and move said twister bars towards each other to the position illustrated in Figure 16.

The said twister bars 174 are separated from each other, and moved to engage the heating element 214, by means of the cam 209 which will rock the lever 206 so as to force the slide bar 181 inwardly, against the pressure of the spring 212, and rotate the rocker bars 176 in the opposite direction.

Assuming that the machine is properly adjusted for the particular article that is to be wrapped therein, such as a lollipop indicated at 207, the sequence of operation is as follows:

The machine is first set in motion by operation of one of the handles, 44—b or 44—c, to slide the collar 43 into engagement with the sprocket 42. This will cause rotation of the shaft 41 and, therethrough, of all the mechanism in the machine and the operator then places the lollipops on the plates 8 of the conveyor belt 7; gauging their position thereon by the guide bar 128.

During the operation of the machine, the driving wheel 36 will rotate the shaft 16 one quarter of a revolution for each revolution of the shaft 41. This rotation of said shaft 16 will cause the conveyor belt 7 to be moved forwardly, one step at a time, bringing the lollipops successively in position between the guide 12—d and the pusher rod 53. Before reaching said position, however, the handles 228 of the lollipops will engage the guide bar 12—c which will properly position said handles with relation to the said pusher rod.

The cam groove 67 will then operate the lever 65 to rock the lever 60 and move the pusher carriage 56 forward; thus causing the pusher rod 53 to force the lollipop through the guide 12—d, at which time, rotation of the crank 98—a, through the rack 98, will have rotated the web feeding rolls 87 and 92 and thus moved a predetermined length of said web below the edge of the cutting knife 130 as clearly illustrated in Figure 5. The lollipop 207 will now engage this portion of the web and move it forwardly into the entrance to the folding horn 71.

At this time the cam 152 will release the roll 151, on the lever 146, and permit the spring 153 to pull on the link 145. This will rock the lever 144 and the post 136; thus moving the edge of the blade 132 across the cutting edge of the blade 130, severing the said length of the web and thereby forming a wrapper blank therefrom.

Continuing the movement of the lollipop, by the pusher bar 53, will cause the said wrapper to be carried through the folding horn with the said lollipop. While it is being carried through said horn, the wrapper will be folded about the lollipop as clearly illustrated in Figures 18 to 27 and as will now be clearly described.

As shown in Figures 24 and 28, the blank is cut off as it is moved forwardly into the folding horn. It will be noted that the lollipop will engage the blank in a position leaving a longer portion at the bottom of the lollipop and a shorter portion at the top. As the movement of the lollipop is continued, the edges 76 of the shoe 74 will engage the wrapper and fold the top and bottom ends thereof across the front of the lollipop. The edges 77 will then force the top portion of the wrapper down and along the sides of the lollipop, as clearly shown at 236, Figure 28. As the said lollipop continues its movement through the horn 71, the sides of the wrapper will ride upwardly on the folding edges 72 of the horn, causing the said edges to be turned downwardly over the shoe 74, as clearly illustrated in Figure 22, and to take the position illustrated in Figure 19. Further movement will fold the said side portions of the wrapper downwardly, into overlapping position upon the top of the lollipop, as clearly illustrated in Figures 22 and 20.

Figure 20:
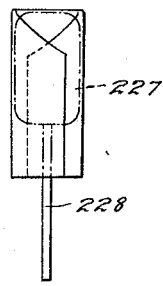
Figure 21:
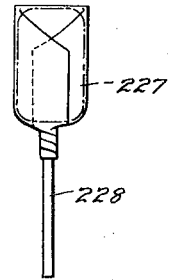

The lollipop will now leave the said horn with the wrapper folded thereon, as shown in Figure 20, and enter into the recess 154, in the turret plate, which is in front of the folding horn. At this time the turret will be in the position illustrated in Figure 6, and close to the end of the folding horn.

Just before the lollipop enters the said recess 154, the cam 163—a will rock the lever 162—a, causing it to rock the lever 160—b. The screw 160—a will then lift the clamping plate 155, over said recess, by means of the pin 160, so that the said clamp will not resist the entrance of the lollipop, and the wrapper thereover, into said recess; thereby avoiding the possibility of the clamping plate disturbing the wrapper. As soon as the lollipop is in said recess, the cam 163—a will cause the pin 160 to be released and permit the spring 158 to force the clamping plate into engagement with the wrapper over the lollipop.

The cam groove 52 will now operate the lever 47 which will, through the link 50, slide the turret carriage 19 and carry the turret plate 18 away from the folding horn to the position, illustrated in Figure 7, in which the end of the handle 228 is free of the said horn. While the said turret is moving to the said position, the cam groove 67 will begin to operate the lever 65 in the opposite direction and start the return of the pusher rod to the position illustrated in Figure 5. At about the time the turret reaches the position indicated in Figure 7, the shaft 16 will again be rotated for one quarter turn by the operation of the driving wheel 36 on the Geneva wheel 35. This will rotate the turret for a distance of 90°, in a clockwise direction, carrying the said lollipop to the next position. During the said rotation of the turret, the cam groove 52 will begin to return the lever 47 towards the position indicated in Figure 5 and move the turret back towards the position illustrated in Figure 6.

Figure 16:
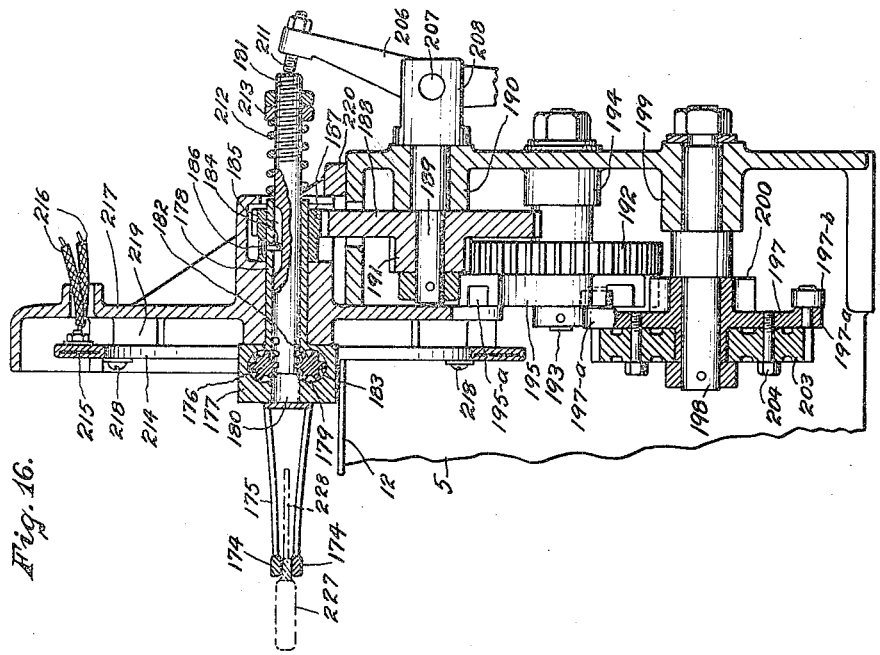
Figure 16 is a side view, of said twister mechanism, in central vertical section.

When the said turret reaches this position, the lollipop will be in alignment with the twister mechanism which will now operate to move the twister bars 174 into contact with the portion of the wrapper that overlaps the end of the lollipop, as clearly illustrated in Figure 16. The mechanism will now operate, as herein before described, to rotate said twister bars and thereby twist the end of the wrapper around the handle 228 of the lollipop, as clearly shown in Figures 6 and 16. The said bars, having been heated by the heating element 214, will seal the wrapper material around said handle and thereby prevent it from untwisting. While this is taking place, the next lollipop on the conveyor belt 7 will be pushed on to the turret.

After the twisting has been completed, the twister bars 174 will be withdrawn from the lollipop and brought into contact with the heating element 214. The turret will now again be moved to the position indicated in Figure 7, pulling with it another lollipop out of the folding horn. The turret will then again be rotated 90°, returned to its position adjacent the end of the folding horn, and so on.

When the turret has returned to the position illustrated in Figure 7, one of the lollipops, on which the wrapper has been twisted, will be brought into a position in alignment with, and over, the ejector chain 164, as clearly illustrated in Figure 6, and at the same time the pin 160 will ride over the end of the releasing screw 161. This will cause said pin to be lifted and thereby raising the clamping plate 155 and releasing the said lollipop. One of the ejector fingers 168 will then engage the end of said lollipop and eject it, from the turret, on to the table 170 from which the lollipop will slide into a convenient receptacle.

From the above description it will be understood that I have provided a wrapping machine employing a novel method of wrapping articles in a fast and efficient manner and whereby an operator simply places the articles in proper position on said machine and, without further attention by the operator, a wrapper blank is provided, the article is wrapped therein, and the wrapper is twisted to retain its proper position over the article and the wrapped article is then ejected from the machine.

While I have shown and described a machine which is particularly adapted for wrapping articles having a handle, such as confectionery lollipops, it is desired to have it understood that the said machine may also be used for wrapping articles of other shapes and sizes, and which may or may not have a handle attached thereto, without departing from the scope of my invention, as set forth in the following claims.

I claim:

1. A wrapping machine comprising a folding device adapted to fold a wrapper over an article upon the movement of said article and wrapper therethrough; said folding device comprising a stationary horn in said machine, a shoe, means on said shoe for folding a portion of said wrapper over said article and forcing the said wrapper downwardly along the sides of said article, and means on said horn for lifting the side portions of said wrapper and folding them down in overlapping position upon the top of said article.

2. In a wrapping machine of the character described, a base, means on an axis extending longitudinally to said base comprising a folding device, a pusher bar and a turret slidingly movable on said axis, means movable transversely to said axis for positioning articles thereon, a pair of feed rolls for feeding the end of a web across said axis, means for operating said pusher bar to move said article with a portion of said web thereover through said folding device and on to said turret, means for moving said turret to withdraw said article from said folding device and then return the said turret adjacent thereto, means for rotating said turret during said movement to transfer said article to a different position in said machine, a twisting mechanism comprising movable bars adapted to be brought into contact with the wrapper on said article and twist the same to retain it thereon, and means for ejecting said article from said turret.

3. In a wrapping machine of the character described, a folding device, means for positioning an article to be wrapped in said machine in front of said folding device, means for presenting a wrapper between said article positioning means and said folding device and means for moving said article from said positioning means into said wrapper and continuing the movement of said article with the wrapper thereover into said folding device and thereby partly wrapping said article within said wrapper; a turret mechanism comprising a plate having means for receiving said partly wrapped article, clamping means associated with said receiving means for retaining said article therein, means for operating said clamping means to render the same inoperative during the movement of said partly wrapped article into said receiving means and then releasing said clamping means to clamp said article in said turret, means for sliding said turret to withdraw said partly wrapped article from said folding means, mechanism for rotating said turret to transfer said article to a different position in said machine, and means operable in said position for twisting said wrapper to retain the same on said article and thereby completing the wrapping thereof.

4. A wrapping machine of the character described comprising means for holding a wrapper on an article with a portion of said wrapper overlapping, a twister mechanism including a pair of members movable into engagement with said overlapping portion of the wrapper, means for revolving said members for twisting said wrapper to retain it on said article and means comprising a fixed ring-shaped heating element for heating said members while out of engagement with said wrapper portion for applying heat to said wrapper during the twisting thereof.

5. In a wrapping machine comprising means for applying a wrapper over an article to be wrapped in said machine and means for positioning said article with the wrapper thereover; mechanism including a pair of oppositely movable bars adapted to engage said wrapper and twist a portion thereof to retain it on said article, a fixed ring-shaped heating element, means for moving the said bars into contact with said heating element, means for moving said bars from said heating element into contact with said wrapper and then returning the same to said heating element and means for revolving said bars while in contact with said wrapper.

6. In a wrapping machine of the character described, a folding device for applying a wrapper to an article while moving therethrough in a certain direction and thereby partly wrapping said article, a turret mechanism adapted to receive said partly wrapped article, means for moving said turret mechanism in said direction for withdrawing said partly wrapped article from said folding device, means for rotating said turret for transferring the said article to a different position in said machine, and mechanism for twisting the wrapper on said partly wrapped article and thereby completing the wrapping thereof.

7. A wrapping machine comprising a folding device, means for positioning an article to be wrapped in said machine in front of said folding device, means for moving said article through said folding device, feed rolls for intermittently feeding the end of a web between said folding device and article, a cutting device associated with said feed rolls for cutting off a portion of said web and thereby providing a wrapper for said article, means for intermittently rotating said rolls, adjustable means for predetermining the length of said portion and means for adjusting said rolls and cutting device to predetermine the vertical position of said wrapper relative to said article.

8. In a wrapping machine of the character described comprising a folding device, a conveyor for moving an article to be wrapped in said machine to a position in alignment with said folding device, means for positioning a wrapper before said article, a turret mechanism comprising a plate adapted to receive said article with said wrapper thereover, a twisting device for twisting a portion of said wrapper to retain it on said article while said article is held in said plate and thereby completing the wrapping thereof, and means for ejecting said article from said machine; a driven shaft, means for driving said shaft, cam means on said driven shaft, a pusher mechanism operated by said cam means for pushing said article from said conveyor through said folding device on to said plate, separate cam means on said driven shaft for moving said turret away from said folding device, an operating shaft, means connecting said driven shaft with said operating shaft for intermittently rotating the latter, means on said operating shaft for rotating said turret and moving said conveyor, means operable by said driven shaft for intermittently operating said twister device, and means operable by said driven shaft for operating the said ejector mechanism.

9. A wrapping machine of the character described comprising a conveyor for moving articles to be wrapped in said machine, a stationary folding device, a turret for transferring said articles to different positions in said machine, means for placing a wrapper of sheet material between said article and said folding device, means for pushing said article from said conveyor into said wrapper to carry said wrapper therewith through said folding device and to said turret, mechanism for sliding said turret to pull said article and wrapper free from said folding device, means for rotating said turret to transfer said article and wrapper to another position in said machine, and means for securing said wrapper to said article while in said position.

10. A wrapping machine of the character described comprising a stationary folding device, means for placing a wrapper in front of said folding device, means for pushing an article to be wrapped on said machine into said wrapper and thereby moving said wrapper and article through said folding device, means in said folding device comprising a horn adapted to fold said wrapper against the bottom of said article, means comprising a shoe extending within said horn for folding portion of said wrapper over said article, means on said shoe for forcing said blank along the edges of said article into overlapping position upon the portion of said wrapper which is folded under said article, and means in said horn for raising the overlapping side portions of said wrapper upwardly, over the sides of said article, and folding them downwardly into overlapping position upon the top of said article during the movement of said article through said folding device.

11. A wrapping machine as set forth in claim 10, including mechanism for engaging the wrapper on said article and twisting it, while the article is stationary, to retain the said wrapper on said article.

12. For a wrapping machine of the character described, a wrapper folding device adapted to fold a wrapper over an article upon the movement of said article therethrough; said folding device including a stationary horn, a shoe member extending at least partly within said horn for causing a portion of said wrapper to be folded over said article, downwardly extending flanges on said shoe for causing the side portions of said wrapper to be forced downwardly along the sides of said article; the said horn being shaped to cause the said side portions of the wrapper to be lifted and then folded downwardly into overlapping position upon the top of said article during the movement of said article and wrapper thereover through said folding device.

13. A folding device adapted to fold a wrapper over an article while the said wrapper and article are moved through said device and comprising a stationary tapering horn, a shoe member located forwardly of said horn and projecting at least partly thereinto, supporting means exteriorly of said horn for supporting said shoe, depending flanges at the sides of said shoe for causing the side portions of said wrapper to be forced downwardly along the sides of said article, and means within said horn comprising a surface tapering in the direction of the axis of said shoe for causing the said portions of said wrapper to be folded upwardly and downwardly into overlapping position upon said article during the movement of said wrapper and article through said folding device.

14. In a wrapping machine comprising means for applying a wrapper over an article, with a portion of said wrapper overlapping, a stationary ring-shaped heating element, wrapper twisting means adapted to engage with said heating element to be heated thereby, mechanism for moving said twisting means into and out of contact with said wrapper, and means for rotating said twisting means for twisting the said overlapping portion of the wrapper.

ANTON VAN VEEN.